United States Patent Office 3,507,434
Patented Apr. 21, 1970

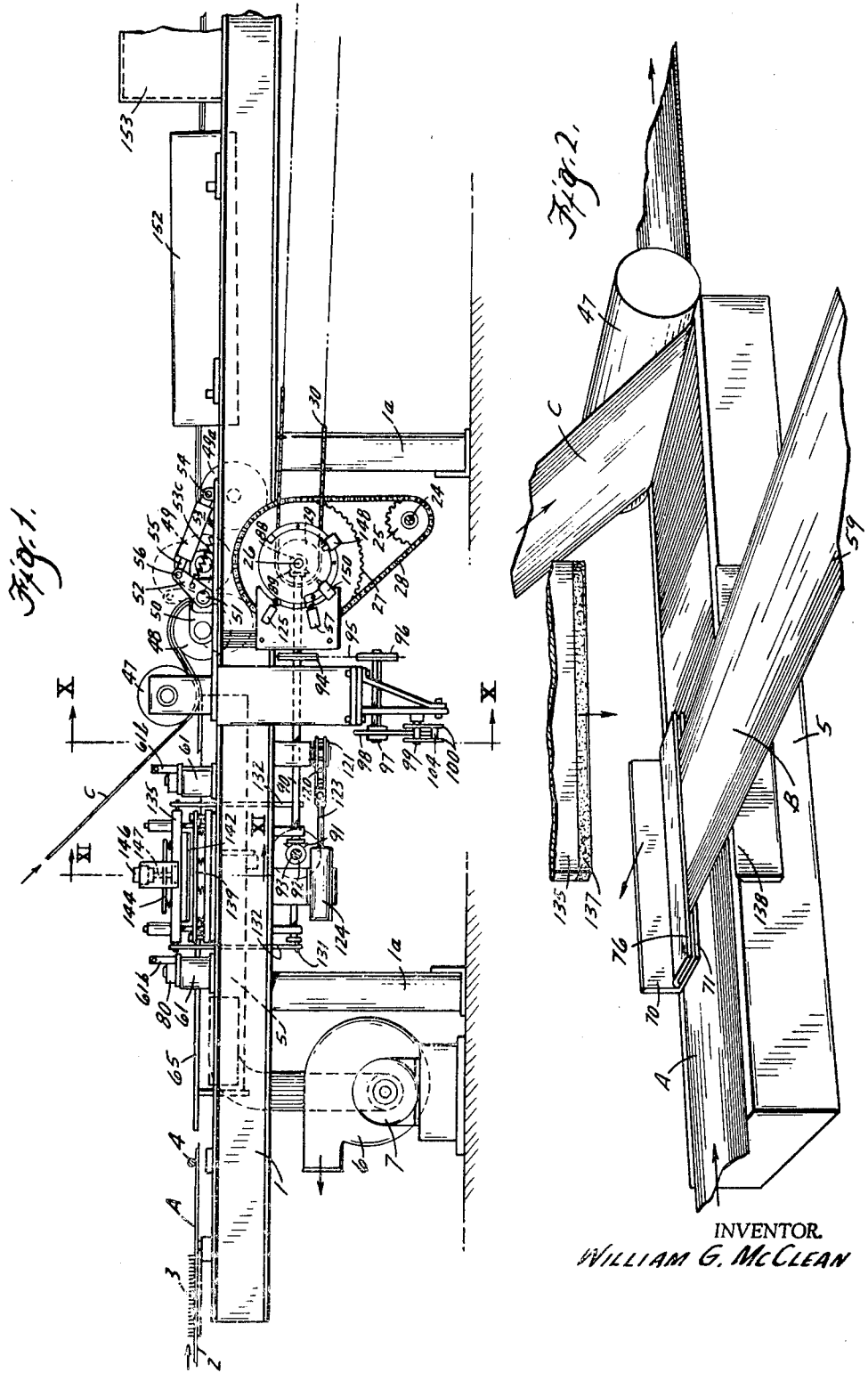

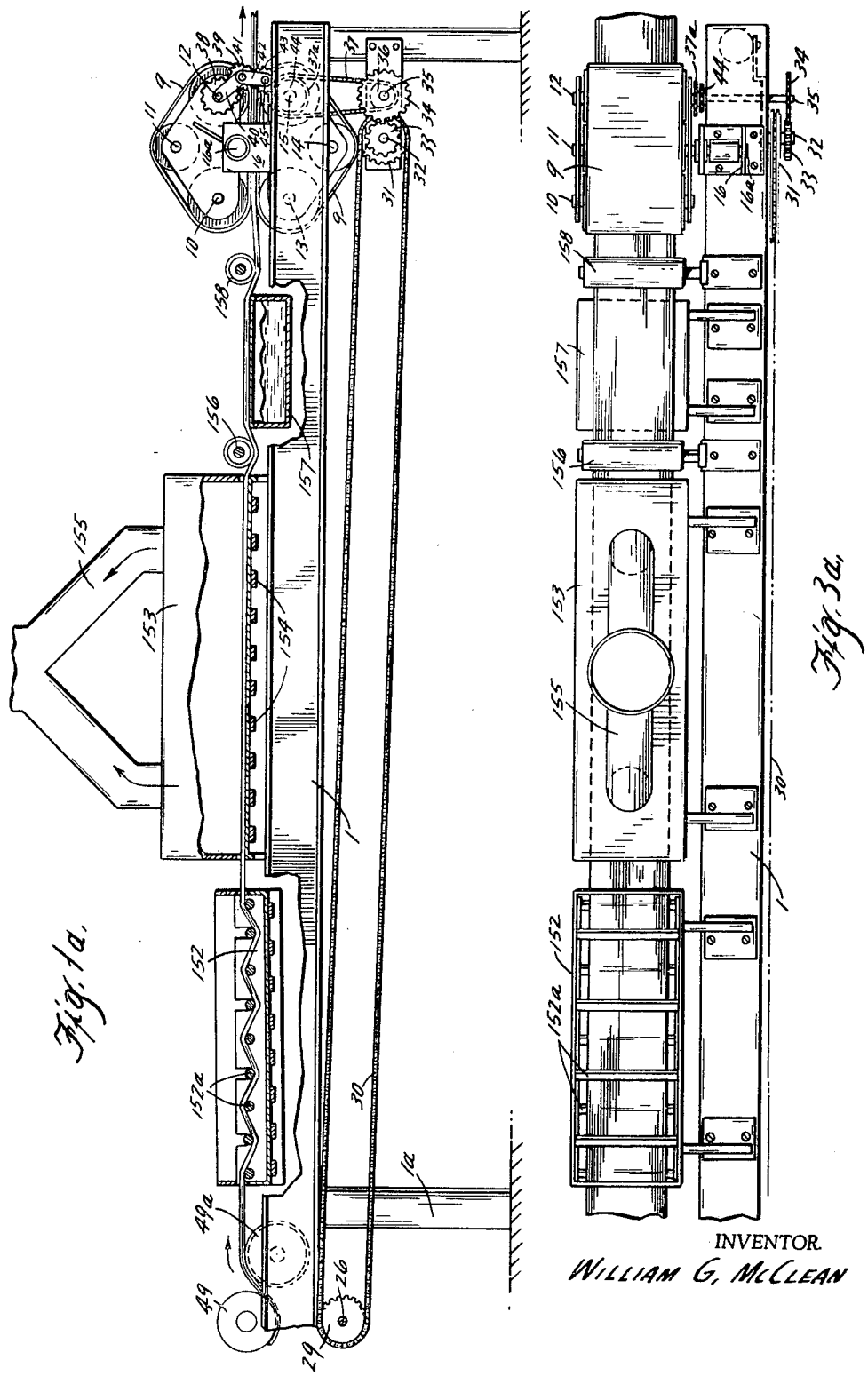

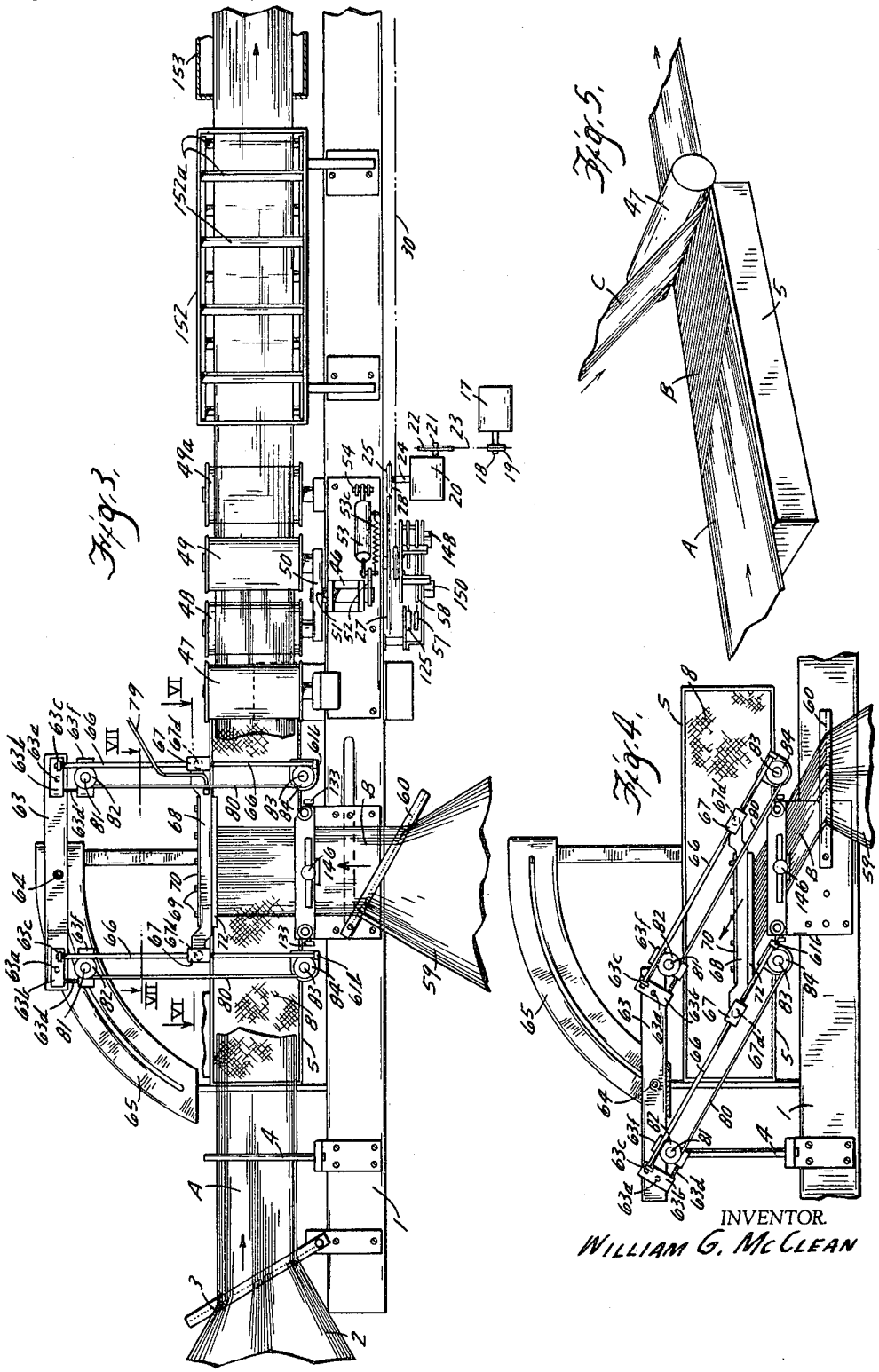

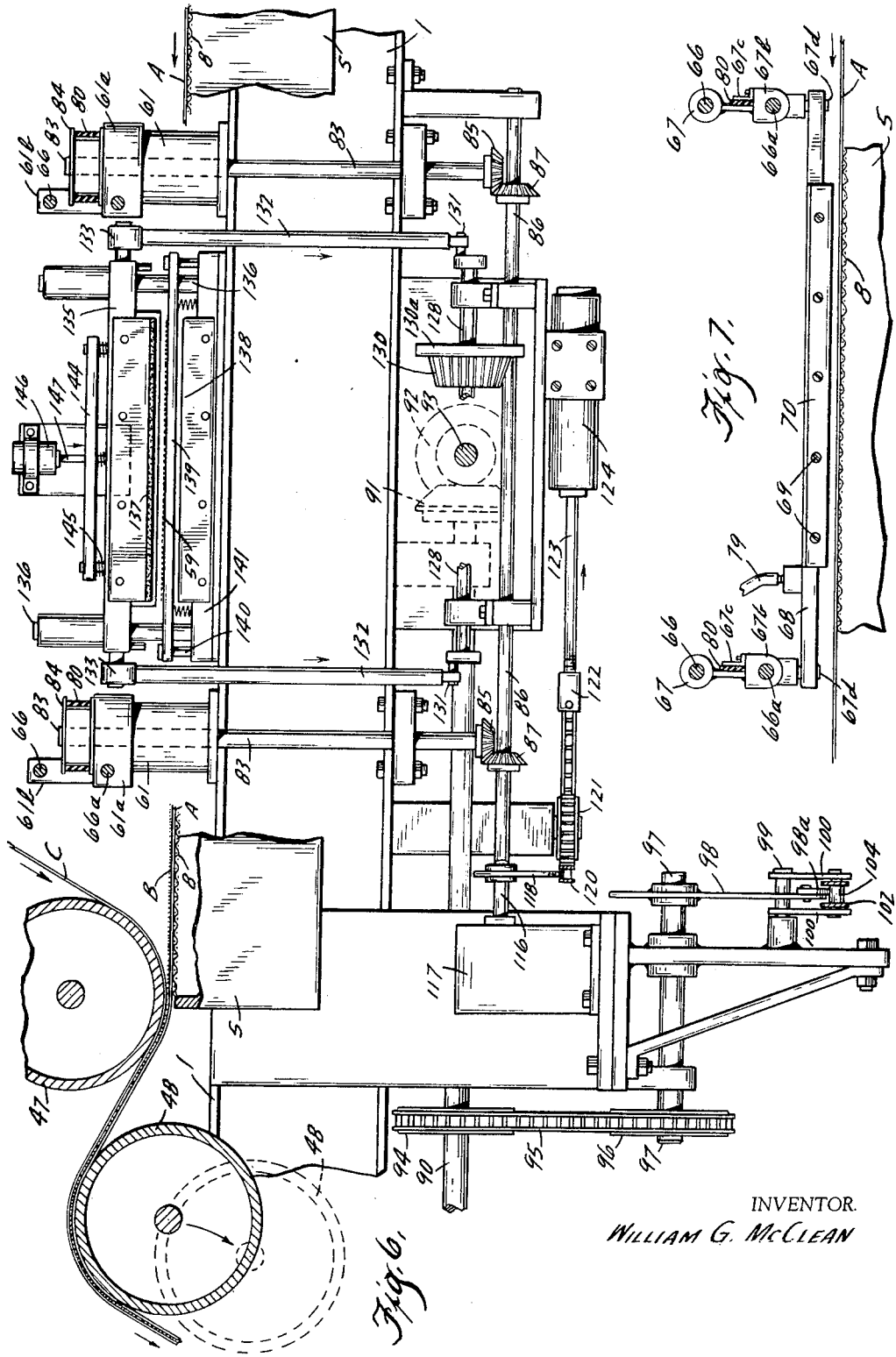
INVENTOR.
WILLIAM G. McCLEAN

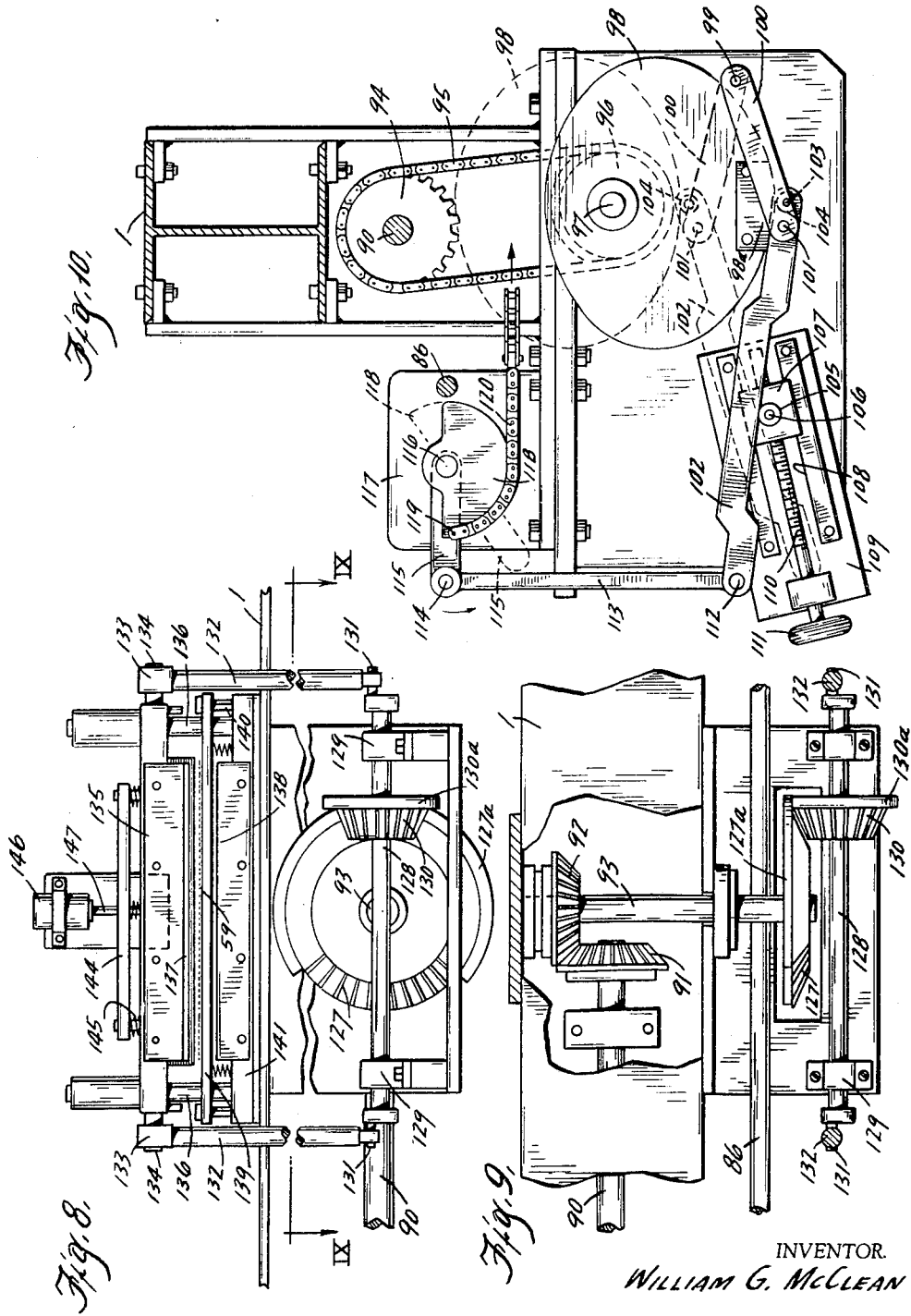

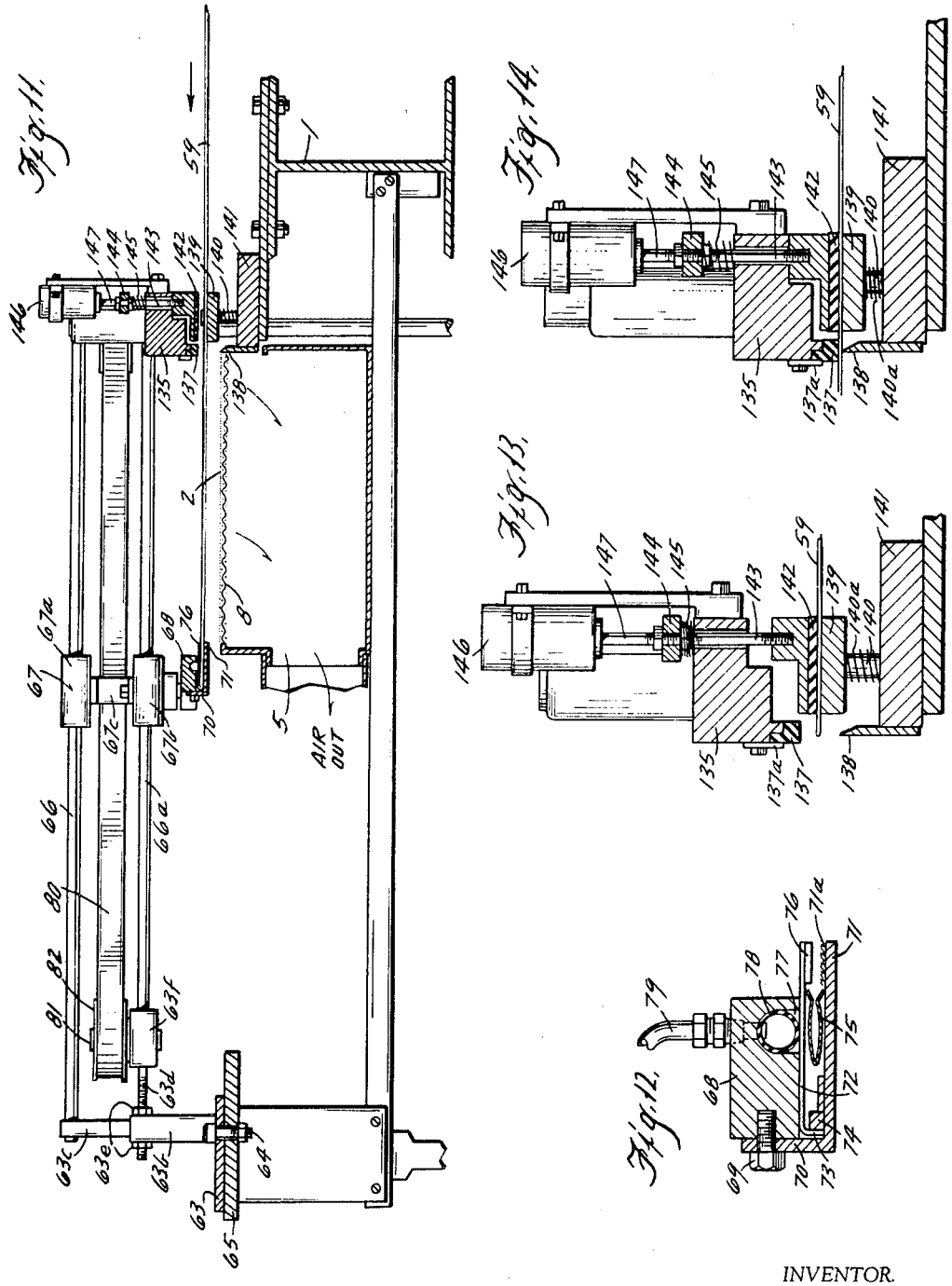

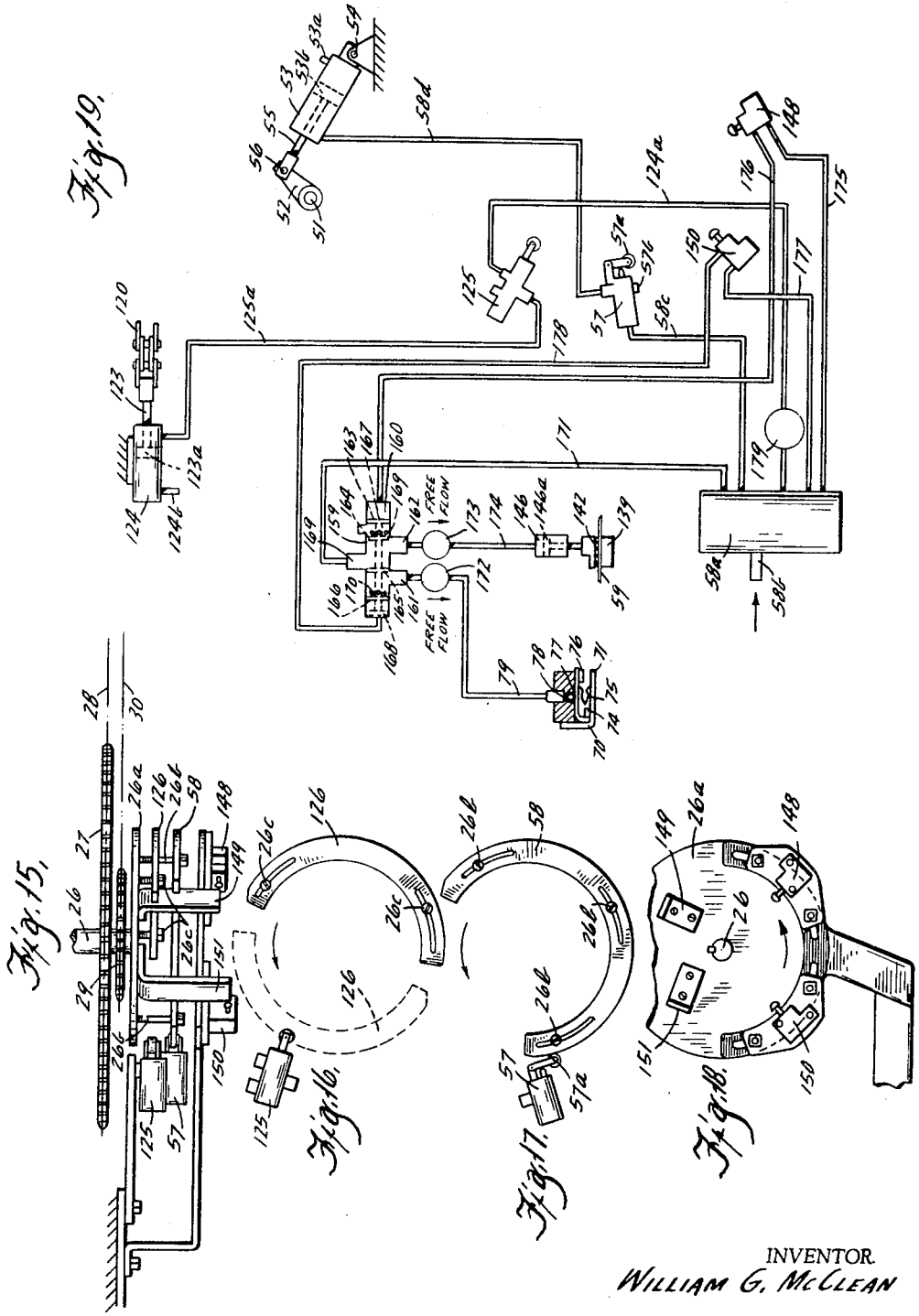

3,507,434
APPARATUS FOR FORMING MULTI-PLY TAPE
William George McClean, Milwaukee, Wis., assignor to The Youngstown Sheet and Tube Company, Boardman, Ohio, a corporation of Ohio
Original application Feb. 12, 1963, Ser. No. 258,039, now Patent No. 3,345,230. Divided and this application Aug. 15, 1967, Ser. No. 660,749
Int. Cl. B65h 17/36
U.S. Cl. 226—142   5 Claims

ABSTRACT OF THE DISCLOSURE

This patent discloses a machine for forming multi-ply tape in which a group of parallel discrete strands of material such as fiber glass are drawn through a station and a cross ply laid on the continuous ply being drawn through the machine. If desired, two plys of continuous material may be utilized, with the cross ply inbetween. The tape may be treated with a binder and then dried and coiled.

---

This application is a division of my co-pending application Ser. No. 258,039 filed Feb. 12, 1963, now U.S. Patent No. 3,345,230.

The invention relates to a method and apparatus for forming multi-ply tape. The tape is formed continuously and may be drawn off and coiled as it is formed. Tape formed according to my invention comprises at least one longitudinal ply and at least one cross ply. In certain of its aspects my invention has especial advantages when the plies are constituted by generally planar groups of generally parallel discrete strands. For example, the plies may be constituted by generally planar groups of generally parallel discrete strands of fibrous glass.

While my invention may be otherwise embodied and practiced it will for purposes of explanation and illustration be described in connection with the continuous forming of multi-ply tape in which each ply is constituted by a generally planar group of generally parallel discrete strands of fibrous glass. I draw lengthwise through my tape forming apparatus a longitudinal generally planar group of generally parallel strands of fibrous glass. The several strands are drawn from spools and guided so that the strands when constituting the longitudinal ply are generally coplanar and parallel and close together but not actually touching (although in some cases the "fuzz" of adjacent strands may touch). The longitudinal strands are drawn forward by suitable drawing or feeding means and a cross ply constituted by a generally planar group of generally parallel strands of fibrous glass extending transversely of the longitudinal strands is applied to the longitudinal ply upstream from the drawing or feeding means so that actually the drawing or feeding means act on the assembled longitudinal and cross plies. In the illustrated embodiment of the invention a second longitudinal ply is applied so that the finished tape is in sandwich form with a cross ply between two longitudinal plies. The tape may be treated with a binder and filler and dried, preferably upstream from the drawing or feeding means, and may be coiled downstream from the drawing or feeding means.

I prefer to employ as the drawing or feeding means opposed endless traction elements which engage the tape at opposite faces together with means for synchronously driving such elements to advance continuously the tape, the driving means being constructed and arranged so that the opposed endless traction elements may be adjusted to different distances from each other or completely separated without disconnecting the driving means or indeed stopping the operation thereof. The width of the traction elements is preferably at least as great as the width of the tape.

The drawing or feeding means preferably act on the tape continuously so that the tape moves at constant speed through such means. However, I provide means upstream from the drawing means acting on the tape being formed to cause the longitudinal strands to alternately advance and dwell. I preferably utilize means alternately increasing and decreasing the length of the path of the longitudinal strands between the spools from which they are drawn and the drawing means with the result that when the length of the path is being increased the longitudinal strands are drawn forward from the spools while when the length of the path is being decreased the longitudinal strands dwell or remain stationary between the spools and the means altering the length of the path, the length of tape being formed which is freed by the decrease in the length of the path being taken up by the drawing means. The means for alternately increasing and decreasing the length of the path function in continuous periodic fashion so that the longitudinal strands upstream therefrom advance a predetermined distance, then dwell for a predetermined time, and repeat the cycle indefinitely.

The cross ply is applied to the longitudinal strands constituting the initial longitudinal ply in increments during dwells of such longitudinal strands. In the illustrated example the cross ply is constituted by a generally planar group of generally parallel cross strands of fibrous glass. The cross ply may be identical in width with the longitudinal ply or it may be wider or narrower. The cross ply is fed in increments transversely of the longitudinal ply, each increment of the cross ply being cut off and applied to the longitudinal ply. The angle of the cross ply relatively to the longitudinal ply may be varied as desired from 90° to a relatively small angle such as 30°. While the longitudinal ply is advancing the cross ply is drawn across the longitudinal ply, and an increment of the cross ply is cut off and is applied to the longitudinal ply during a dwell of the longitudinal ply. In the illustrated embodiment of the invention the cross ply is applied atop the initial longitudinal ply. If the cross ply is to be continuous on the longitudinal ply each increment of the advance of the longitudinal ply between dwells should be for a distance equal to the dimension of the cross ply lengthwise of the longitudinal ply. Suction may be employed to draw the cross ply to the longitudinal ply.

In the illustrated embodiment of the invention a second longitudinal ply is applied against the cross ply. The second longitudinal ply may be omitted, or the tape may be built up with an number of alternate longitudinal and cross plies or a longitudinal ply with successive cross plies at different angles, depending upon the use to which the tape is to be put. I find that at least a second longitudinal ply is useful in holding the cross ply in place during travel through the treating bath.

After the plies have been superimposed upon one another the assembly of plies passes through a treating bath consisting of heated resin in a tank. The resin permeates between the strands and acts as a binder to permanently secure the strands together in a unitary multi-ply tape and also as an impregnant or filler. The tape upon leaving the resin bath may be dried in air or in a drying chamber and also may be cooled to eliminate tackiness so that by the time the tape reaches the traction elements the resin is dry and in condition to be coiled.

I have given above a general description of my method and apparatus, but the invention involves a number of relatively specific method steps and apparatus features which can best be described and explained in the following portion of the specification dealing with the specifics of my method and apparatus.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which:

FIGURE 1 is a partial diagrammatic side elevational view of a form of my apparatus suitable for forming multi-ply tape consisting of two longitudinal plies with one cross ply therebetween;

FIGURE 1a is also a partial diagrammatic side elevational view of the apparatus, the left-hand end of FIGURE 1a substantially duplicating, although in somewhat more detail, the right-hand end of FIGURE 1, FIGURE 1a showing the apparatus through the drawing or feeding means, portions of the apparatus being shown in vertical longitudinal cross section;

FIGURE 2 is a fragmentary enlarged scale perspective diagram showing how the plies of my multi-ply tape are assembled one upon another and showing the means for drawing the cross ply across the underlying longitudinal ply and the means for shearing off increments of the cross ply;

FIGURE 3 is a partial plan view of the apparatus substantially coextensive in length with FIGURE 1, a portion of the apparatus being shown in horizontal cross section;

FIGURE 3a is also a partial plan view of the apparatus, the left-hand end of FIGURE 3a substantially duplicating the right-hand end of FIGURE 3, FIGURE 3a being only slightly less than coextensive in length with FIGURE 1a;

FIGURE 4 is a fragmentary plan view of a portion of the structure shown in FIGURE 3 and illustrating the means for drawing the cross ply across the longitudinal ply adjusted in a different position than the position in which such means are shown in FIGURE 3;

FIGURE 5 is a fragmentary perspective diagram similar to FIGURE 2 but to somewhat smaller scale, showing the multi-ply tape in process of formation but omitting the means for drawing the cross ply across the longitudinal ply and the means for shearing off increments of the cross ply;

FIGURE 6 is an enlarged fragmentary vertical cross-sectional view of a portion of the apparatus taken on the line VI—VI of FIGURE 3;

FIGURE 7 is an enlarged fragmentary vertical cross-sectional view taken on the line VII—VII of FIGURE 3;

FIGURE 8 is a fragmentary elevational view showing a portion of the structure shown in FIGURE 6 and also showing the gearing for operating the shearing means;

FIGURE 9 is a fragmentary horizontal cross-sectional view taken on the line IX—IX of FIGURE 8;

FIGURE 10 is an enlarged detail transverse cross-sectional view taken on the line X—X of FIGURE 1;

FIGURE 11 is an enlarged fragmentary transverse cross-sectional view taken on the line XI—XI of FIGURE 1;

FIGURE 12 is a fragmentary vertical transverse cross-sectional view illustrating the means for seizing the leading edges of the cross strands forming the cross ply and drawing the same across the longitudinal ply;

FIGURE 13 is a fragmentary vertical transverse cross-sectional view illustrating the means for clamping and severing the cross ply;

FIGURE 14 is a view similar to FIGURE 13 illustrating the apparatus of FIGURE 13 in a different operative position;

FIGURE 15 is a fragmentary view to enlarged scale of a portion of the mechanism at the lower central part of FIGURE 3 showing a portion of the driving mechanism and control means;

FIGURE 16 is a diagram of the upper valve shown in FIGURE 15 and the cam for operating it;

FIGURE 17 is a diagram of the intermediate valve shown in FIGURE 15 and the cam for operating it;

FIGURE 18 is a diagram of the two lower valves shown in FIGURE 15 and the cams for operating them; and FIGURE 19 is a flow diagram showing the valves, the elements operated thereby and the pressure fluid connections therebetween.

Referring now more particularly to the drawings, the apparatus is carried by a generally horizontal supporting structure 1 mounted on legs 1a. Longitudinal strands 2 of fibrous glass are drawn from suitably arranged spools (not shown) through a comb 3 which spaces the strands 2 apart at substantially equal intervals so that they constitute a longitudinal ply A of a multi-ply tape to be formed. In my apparatus the longitudinal ply A passes beneath a positioning rod 4 and thence atop a vacuum chamber 5 in which negative pressure is maintained by a blower 6 driven by an electric motor 7. The top of the vacuum chamber 5 is constituted by screening 8. The positioning rod 4 keeps the strands 2 in the comb 3, in a plane and against the top of the vacuum chamber. The longitudinal ply A passes continuously in a straight line from left to right viewing FIGURES 1, 1a, 2, 3 and 3a while the cross ply and a second longitudinal ply are applied thereto, and at a location not shown in the drawings but to the right of the apparatus shown in FIGURES 1a and 3a the finished cross-ply tape is coiled upon a reel.

The tape being formed is moved through the apparatus in controlled manner by opposed endless traction elements 9 supplemented by other means presently to be described. The endless traction elements 9 may be belts of rubberized or similar material. The upper endless traction element 9 is trained about pulleys mounted on shafts 10, 11 and 12 and the lower endless traction element 9 is trained about pulleys mounted on shafts 13, 14 and 15 (FIG. 1a) so that the lower reach of the upper endless traction element 9 and the upper reach of the lower endless traction element 9 are parallel. The shafts 10, 11 and 12 are mounted in an upper supporting frame and the shafts 13, 14 and 15 are mounted in a lower supporting frame. The lower supporting frame is mounted in stationary position on the supporting structure 1 while the upper supporting frame is vertically adjustable in the opposed supporting brackets 16 by an eccentric 16a and provided with means (not shown) for fastening it in desired adjusted positions while maintaining its orientation with the lower reach of the upper endless traction element 9 horizontal and parallel to the horizontal upper reach of the lower endless traction element 9. The upper frame carrying the upper endless traction element 9 is adjusted relatively to the lower frame carrying the lower endless traction element 9 so that the opposed horizontal reaches of the two traction elements press against the upper and lower faces of the tape to draw or feed the same toward the right viewing FIGURES 1, 1a, 2, 3 and 3a.

The power for operating the apparatus is furnished by an electric motor 17 whose shaft 18 carries a sprocket 19. A speed reducer with a variable speed adjustment 20 has a driving shaft 21 to which is fixed a sprocket 22. A sprocket chain 23 is trained about the sprockets 19 and 22 so that upon operation of the motor 17 the speed reducer 20 is driven. Through the adjustment means forming part of the speed reducer 20 the driven shaft 24 of the speed reducer may be driven at any desired speed. Fixed to the shaft 24 is a sprocket 25. Mounted in the supporting structure 1 is a cam shaft 26 to which is fixed a sprocket 27. A sprocket chain 28 is trained about the sprockets 25 and 27 whereby the sprocket 27 and hence the cam shaft 26 is driven.

Fixed to the cam shaft 26 is a sprocket 29 about which is trained a sprocket chain 30 which also extends about a sprocket 31 fixed to a shaft 32 journaled in the supporting structure 1. Fixed to shaft 32 is a gear 33 which meshes with a gear 34 fixed to a shaft 35. Fixed to the shaft 35 is a sprocket 36. A sprocket chain 37 is trained about the sprocket 36 and also about a sprocket 37a fixed to the shaft 15 whereby the lower endless traction element 9 is driven. Fixed to the shaft 12 is a gear 38 which meshes with a pinion 39 mounted for movement about the axis of the shaft 12 by a link 40. The link 40 is pivoted at 41 (coincident with the axis of the pinion 39) to a link 42 which at its opposite end is pivoted at 45 to the frame carrying the lower endless traction element 9. Journaled in such frame to turn about the axis of pivot 45 is a pinion 43 which meshes with the pinion 39 and also with a gear 44 fixed to the shaft 15. By this mechanism the upper and lower endless traction elements 9 always rotate in unison with their opposed generally horizontal reaches moving toward the right, yet without disturbing the driving connections or indeed the actual operation thereof they can be adjusted toward and away from each other. As the frame carrying the upper endless traction element 9 moves upwardly the links 40 and 42 partially straighten out while all of the driving gears and pinions remain in mesh.

The width of the endless traction elements 9 is somewhat greater than the width of the tape so that the endless traction elements will engage opposite faces of the tape throughout its enire width. As it passes between the endless traction elements 9 the tape moves from left to right viewing FIGURES 1a and 3a at constant speed.

The tape being formed before reaching the endless traction elements 9 passes under a guide roller 47 and thence somewhat upwardly and over a roller 48 and thence downwardly and under a roller 49. The rollers 48 and 49 are carried by a yoke 50 which in turn is fixed to a shaft 51 mounted in the supporting structure at 46 and to which is fixed an arm 52. A single acting cylinder 53 vented to the atmosphere at 53a at its head end (FIGURE 19) is pivoted to the supporting framework at 54 and contains a piston 53b having a piston rod 55 which is pivoted to the arm 52 at 56.

The cam shaft 26 carries a back plate 26a which through studs 26b carries a cam 58. A valve 57 carried by the machine frame is actuated by the cam 58 as the cam shaft 26 rotates. Compressed air from an air compressor (not shown) is delivered to a manifold 58a through a pipe 58b and from the manifold through a pipe 58c to the valve 57. A pipe 58d leads from the valve 57 to the rod end of the cylinder 53. When the valve 57 is opened by engagement of the following roller 57a with the cam 58 compressed air is delivered through the pipe 58d to the rod end of the cylinder 53, moving the piston in that cylinder generally toward the right viewing FIGURES 1, 3 and 19 which moves the roller 48 upwardly and the roller 49 downwardly and increases the length of the path of the tape being formed. Upon continued rotation of the cam shaft 26 the cam 58 passes out of contact with the following roller 57a and the valve 57 is spring-closed and the pipe 58d vented to the atmosphere through the port 57b. This permits movement of the piston in the cylinder 53 toward the rod end of the cylinder which is caused by tension in the longitudinal ply A of the tape being formed, moving the roller 48 downwardly and the roller 49 upwardly and thus shortening the path of the tape being formed. A tension coil spring 53c is connected at its upper end with the arm 52 and at its lower end with the supporting structure and prevents the tape being formed from becoming slack when pressure is off the cylinder 53.

Thus in operation of the apparatus the yoke 50 carrying the rollers 48 and 49 oscillates back and forth. The movement of the rollers 48 and 49 caused by such oscillation of the yoke 50 alternately increases and decreases the length of the path of the longitudinal ply A between the spools from which the longitudinal strands are taken and the endless traction elements 9. When the rollers 48 and 49 are in position with their axes in the same horizontal plane as shown in solid lines in FIGURE 1 the length of the path of the longitudinal ply A is maxiuum. When the roller 48 moves downwardly and the roller 49 moves upwardly to the dotted positions indicated in FIGURE 1, the length of the path of the longitudinal ply A is shortened.

It being borne in mind that the tape being formed is being continuously advanced from left to right viewing FIGURE 1 at constant speed by the opposed endless traction elements 9, the portion thereof to the left of the rollers 48 and 49 alternately advances to the right and dwells. When the roller 48 moves downwardly and the roller 49 moves upwardly the portion of the longitudinal ply A to the left of the rollers 48 and 49 dwells as the tape being formed is in effect payed out by the rollers 48 and 49 at the same speed as it is being advanced toward the right therefrom by the endless traction elements 9. When the roller 48 moves upwardly and the roller 49 moves downwardly to the position shown in solid lines in FIGURE 1 the portion of the longitudinal ply A to the left of the rollers 48 and 49 viewing FIGURE 1 (and the portion of the tape being formed between the point of application of the cross ply to the longitudinal ply and the rollers 48 and 49) is drawn forward. The timing of the elements of the apparatus is such that the cross ply increments presently to be described are applied to the longitudinal ply during dwells of the longitudinal ply.

Transverse strands 59 of fibrous glass are drawn from suitably arranged spools (not shown) through a comb 60 which spaces the strands 59 apart at substantially equal intervals so that they constitute a cross ply B. The comb 60 is mounted so as to be adjustably positionable both angularly and parallel to the length of the longitudinal ply A. In my apparatus the cross ply B passes transversely over the top of the longitudinal ply A, increments of the cross ply B are cut off and those increments are applied to the longitudinal ply A during dwells of the longitudinal ply. The increments of cross ply B are applied to longitudinal ply A over the vacuum chamber 5.

Mounted on the supporting structure 1 closely adjacent one edge of the path of the longitudinal ply A where the longitudinal ply A passes over the vacuum chamber 5 are two generally cylindrical mounting brackets 61 (FIGURE 6) spaced apart in the direction of the path of the longitudinal ply A. Rotatably mounted on each bracket 61 is a collar 61a. Each collar 61a has at one side thereof an upward extension 61b.

Disposed parallel to the path of the longitudinal ply A and at the side of that path opposite the mounting brackets 61 is a mounting member 63 (FIGURES 3, 4 and 11). Pivoted to the mounting member 63 by pivots 63a spaced apart the same distance as the axes of the mounting brackets 61 are brackets 63b each having an upward extension 63c. Parallel rods 66 are fastened to and extend between the respective extensions 61b and 63c as clearly shown in FIGURES 3 and 4. Adjustably carried by each bracket 63b by two horizontally spaced apart studs 63d with nuts 63e applied thereto at opposite faces of the bracket 63b is a mounting member 63f in which is mounted a vertical spindle 81. Directly beneath each rod 66 is a rod 66a. Each of the rods 66a is connected with the corresponding collar 61a at one end and the corresponding mounting member 63f at the other end. The structure just described constitutes in effect a shiftable parallelogram which may assume the position shown in FIGURE 3 or the position shown in FIGURE 4 or any intermediate position.

In FIGURE 3 the swingable opposed arms of the parallelogram are disposed at right angles to the path of the longitudinal ply A while in FIGURE 4 they are shown at an angle of approximately 30° to the path of the longitudinal ply A. The parallelogram structure may be fastened in any desired adjusted position by a bolt or other appropriate fastening means 64 which fastens the mounting member 63 to a segment 65 fastened to and in effect forming part of the supporting structure. The generally cylindrical mounting brackets 61 are as above indicated closely adjacent one edge of the path of the longitudinal ply A and the swingable opposed arms of the parallelogram extend across and beyond the path of the longitudinal ply A as shown in FIGURES 3 and 4.

A slide designated generally by reference numeral 67 (FIGURE 11) and comprising sleeves 67a and 67b through which the rods 66 and 66a respectively pass and also comprising a portion 67c extending between and connecting the sleeves 67a and 67b is provided at each side of the parallelogram, the slides 67 being slidable along the swingable opposed arms of the parallelogram. Extending between the slides 67 and pivotally connected to each thereof at 67d is a cross member or puller 68 shown in enlarged cross section in FIGURE 12. Connected with the cross member 68 by screws 69 is an L-shaped member 70 whose right-hand extremity 71 viewing FIGURE 12 having a cloth pad 71a adhesively attached to its upper surface constitutes the lower one of a pair of cooperating jaws for seizing the forward edges of the cross strands 59 of the cross ply B and drawing the cross strands across the longitudinal strands. A member 72 has its left-hand end 73 viewing FIGURE 12 turned downwardly and disposed between the upright end portion of the L-shaped member 70 and a strip 74 fastened atop the horizontal portion of the member 70 so that the member 72 is essentially mounted for turning or quasi-pivotal movement relatively to the member 70. A spring 75 is interposed between the horizontal portions of the members 70 and 72 and normally maintains the member 72 up against the bottom of the cross member 68 as shown in FIGURE 12 and so that its right-hand end or jaw 76 viewing FIGURE 12 is spaced from the lower jaw 71.

A channel 77 is formed in the bottom of the cross member 68 above the member 72 and a flexible tube 78 of material such as rubber is disposed in the channel and connected with a pipe 79 connected with the compressed air manifold 58a by valves and connections which will be presently described. Both ends of the flexible tube 78 are closed. When compressed air is admitted to the tube 78 that tube instantly expands throughout its length and forces the upper jaw 76 down against the lower jaw 71 to seize the leading ends of the cross strands 59 and provide a gripping means.

The slides 67 are connected to opposed endless belts 80 by clamps which may constitute the portions 67c of the slides 67 so that movement of the belts 80 causes movement of the slides 67 along the swingable opposed arms of the parallelogram. By means controlling the travel of the endless belts 80 first in one direction and then in the other direction presently to be described the cross member 68 moves back and forth across the longitudinal strands 2, the parts being timed so that before each movement in the direction corresponding to the upward direction viewing FIGURE 3 or FIGURE 4 the jaws 76 and 71 seize the leading ends of the cross strands 59 and draw the cross strands across the longitudinal strands.

A pulley 82 is rotatably mounted on each spindle 81. Journaled in the supporting structure 1 and extending upwardly through each of the generally cylindrical mounting brackets 61 is a shaft 83. Fixed to each shaft 83 above the corresponding collar 61a is a pulley 84. The endless belts 80 are trained above the respective pairs of pulleys 82 and 84.

At its lower end each shaft 83 has fixed thereto a bevel gear 85 (FIGURE 6). Rotatably mounted in the supporting structure is a longitudinal shaft 86 having bevel gears 87 fixed thereto, the respective bevel gears 87 meshing with the respective bevel gears 85 as shown in FIGURE 6.

The cam shaft 26 has fixed thereto a bevel gear 88 (FIGURE 1) with which meshes a bevel gear 89 fixed to a longitudinal shaft 90 to which is fixed a bevel gear 91 which meshes with a bevel gear 92 fixed to a cross shaft 93. Thus the cross shaft 93 is driven continuously at constant speed.

Fixed to the longitudinal shaft 90 (FIGURES 1 and 10) is a sprocket 94 with which meshes a sprocket chain 95 which in turn meshes with a sprocket 96 fixed to a shaft 97 to which is also fixed a cam 98 having an attached lobe 98a for a purpose to be presently described, which cam rotates continuously during operation of the apparatus.

Pivoted to the supporting structure at 99 is a two-part link 100 which is pivoted at 101 to a lever 102. The lever 102 carries at 103 a cam following roller 104 which at all times follows the cam 98. The lever 102 at all times rides upon a fulcrum roller 105 mounted on a stud 106 carried by a block 107 movable along a guideway 108 on a plate 109 mounted on the supporting structure. A screw 110 is journaled in the plate 109 and is threaded through the block 107. The screw may be turned by a hand wheel 111 fixed thereto. By the hand wheel 111 the position of the fulcrum roller 105 may be adjusted which in turn alters the amplitude of movement of the left-hand end of the lever 102 which as will presently appear alters the amplitude of movement of the cross member 68 along the swingable opposed side arms of the parallelogram.

Pivoted to the lever 102 at 112 is a link 113 which is pivotaly connected at 114 to an arm 115 which is fastened to a shaft 116. The shaft 116 is the driving shaft of a speed increaser mounted in a housing 117. The driven shaft of the speed increaser is the shaft 86. Fixed to the shaft 116 outside the housing 117 is a segment 118 to which is connected at 119 a chain 120. The chain extends about the curved face of the segment 118 and about a sprocket pulley 121 and is connected at 122 with the piston rod 123 of a piston 123a in a cylinder 124 mounted on the supporting structure. Compressed air to the rod end of cylinder 124 is delivered from the manifold 58a through an air pressure regulator 179 and a pipe 124a, a valve 125 and a pipe 125a. The valve 125 is controlled by cam 126 carried by the back plate 26a through studs 26c. The head end of cylinder 124 is vented to the atmosphere through vent 124b. The air pressure regulator 179 reduces the air supply pressure to the valve 125 and the cylinder 124 to prevent the cross member 68 from returning too rapidly in its movement toward the right viewing FIGURE 11.

Normally the valve 125 is open to allow compressed air to flow from the pipe 124a through the valve and through the pipe 125a into the cylinder 124 at the rod end thereof. The compressed air urges the piston to the left viewing FIGURES 1 and 19 and to the right viewing FIGURE 6 which through the chain 120 and the segment 118 maintains the shaft 116 under torque tending to turn that shaft in the counterclockwise direction viewing FIGURE 10. This results, through the arm 115 and the link 113, in pressing the lever 102 down against the fulcrum roller 105 so that as the cam 98 turns the lever 102 oscillates about the portion of its lower edge which engages the fulcrum roller 105, such oscillation of the arm 102 being accompanied by slight longitudinal movement of the arm along the fulcrum roller 105. The speed increaser in the housing 117 amplifies the turning of the shaft 86 in relation to the turning of the shaft 116. But through the bevel gears 85 and 87 the shaft 86 as it partakes of back and forth oscillatory movement oscillates the endless belts 80 which in turn oscillate the cross member 68. Through that mechanism the cross member 68 carrying the jaws 71 and 76 for seizing the leading edges of the transverse strands 59 is oscillated back and forth along the rods 66 and 66a and the jaws 71 and 76 are opened and closed in proper timed relationship to draw the transverse strands across the longitudinal strands upon each movement of the cross member 68 in the upward direction viewing FIGURE 3.

The cam 98 is shaped so that there is a momentary dwell when the leading ends of the transverse strands have been drawn across the longitudinal strands to a point where they are at the upper edge of the longitudinal ply A viewing FIGURE 3. At that time the jaws open and release the transverse strands. Just after opening of the jaws to release the transverse strands the cross member 68 is advanced a short distance further in the upward direction viewing FIGURE 3 by lobe 98a so that the jaws 71 and 76 will clear the ends of the transverse strands, whereafter the cross member 68 will move back in the downward direction viewing FIGURE 3 for the beginning of the succeeding cycle. The lobe 98a is removable; it may be replaced by a lobe of different shape. The shape of the lobe can be varied according to tape width.

The continuously rotating shaft 93 has fixed thereto a bevel gear 127 which has teeth throughout only approximately 90° of its circumference, the remaining aproximately 270° being blank as shown in FIGURES 8 and 9. A shaft 128 is journaled for rotation in bearings 129 and has fixed thereto a bevel gear 130 positioned to mesh with the teeth of the bevel gear 127 when such teeth are opposite the bevel gear 130. The flat 130a on the circumference of gear 130 rides on the rim 127a of gear 127 to space the gears for proper engagement. The ends of the shaft 128 have synchronously operable eccentric crank pins 131 which oscillate generally vertical connecting rods 132 which have bearings 133 receiving trunnions 134 of an upper shear head 135 which is guided for vertical movement by guides 136.

The upper shear head 135 (see FIGURES 13 and 14) has a strip of resilient rubber-like material 137 applied thereto and maintained in place by a clamp 137a, and directly therebelow is disposed in fixed position a sharp steel shear blade 138. As the shaft 128 rotates the upper shear head 135 moves up and down. The teeth of the bevel gear 127 which extend for only approximately 90° of the circumference thereof cause the gear 130 to rotate through a complete revolution as the teeth mesh. Hence the upper shear head 135 descends and rises again during approximately 90° of rotation of the bevel gear 127 and remains stationary during the remaining approximately 270° of rotation of the bevel gear 127.

Referring to FIGURES 13 and 14, a platen 139 is carried by pins 140 which are guided in the stationary base 141 which carries the fixed shear blade 138. Springs 140a are interposed between the platen 139 and the base 141, such springs urging the platen upwardly to the level at which it is shown in FIGURES 11 and 13 with stop means (not shown) for limiting upward movement of the platen at that level. A clamping jaw 142 is disposed above the platen 139 and carried by upwardly extending pins 143 connected with a crosshead 144. Springs 145 are disposed about the pins 143 between the upper surface of the upper shear head 135 and the lower surface of the crosshead 144. The crosshead 144 is connected with a piston 146a in a cylinder 146 by a piston rod 147.

Mounted at a suitable location in the supporting structure is a cylinder valve comprising a casing 159 (FIGURE 19) having an inlet 160 for fluid under pressure, such as compressed air, and outlets 161 and 162. A spool valve 163 operates in the casing 159 and comprises discs 164, 165 and 166 as shown. The right-hand end of the spool valve viewing FIGURE 19 is designated 167 and the left-hand end is designated 168. Two sets of vent ports 169 and 170 are provided as shown.

A pipe 171 leads from compressed air manifold 58a to the inlet 160 to the valve casing 159 so that compressed air is always available at the inlet 160. The outlet 161 is connected with the pipe 79 through a flow regulator 172 which restricts the exhaust through the set of vent ports 170. The outlet 162 is connected with the upper end of the cylinder 146 through a flow regulator 173 by a pipe 174. The flow regulator 173 restricts the exhaust through the set of vent ports 169. A pipe 175 leads from the manifold 58a to the valve 148 and a pipe 176 leads from the valve 148 to the right-hand end of the valve casing 159. A pipe 177 leads from the manifold 58a to the valve 150 and a pipe 178 leads from the valve 150 to the left-hand end of the valve casing 159.

It being borne in mind that the mechanism shown in FIGURES 13 and 14 is mounted in position at the right-hand edge of the path of the longitudinal ply viewing FIGURE 11 while the mechanism shown in FIGURE 12 partakes of oscillating movement across the longitudinal ply, with the upper shear head 135 in its raised position and with the upper clamping jaw 142 in clamping position so that the transverse strands 59 are clamped, as shown in FIGURE 13, and with the valve 163 in the position shown in FIGURE 19 the cross member 68 is moved from its position as shown in FIGURE 11 to the right across the longitudinal ply and with the jaws 71 and 76 open as they are shown in FIGURES 12 and 19. When the cross member 68 reaches the extreme right-hand end of its travel viewing FIGURE 11 the cam 151 opens the valve 150 admitting compressed air to the left-hand end of the valve casing 159 through the pipe 177, the valve 150 and the pipe 178. This moves the valve 163 to the right-hand end of the casing 159, admitting compressed air to the pipe 79 and opening the pipe 174 to exhaust. This admits compressed air to the tube 78 and closes the jaw 76 against the jaw 71 to grip the leading ends of the cross strands 59 of the cross ply B. At almost the same time but with slight delay caused by the flow regulator 173 the springs 145 (FIGURE 13) are allowed to raise the crosshead 144 and with it the clamping jaw 142 to release the strands 59. The cross member 68 then moves to the left viewing FIGURE 11 to the position in which it is shown in that figure with the leading ends of the cross strands gripped by the jaws 71 and 76 as shown. When the cross member 68 has reached the end of its stroke toward the left viewing FIGURE 11 cam 149 opens valve 148, admitting compressed air to the right-hand end of the valve casing 159 through the pipe 175, the valve 148 and the pipe 176. This moves the valve 163 to the left-hand end of the casing 159 to the position shown in FIGURE 19, admitting compressed air to the pipe 174 and opening the pipe 79 to exhaust. This admits compressed air to the cylinder 146 above the piston 146a and closes the clamping jaw 142 against the platen 139 to grip the strands 59. At almost the same time but with slight delay caused by the flow regulator 172 the spring 75 (FIGURE 12) is allowed to raise the jaw 76 to release the leading ends of the strands 59. The flow regulators 172 and 173 restrict the exhaust from the tube 78 and the piston 146 respectively to insure that the cross ply strands are seized by one clamp before they have been released by the other.

The upper shear head 135 then moves downwardly and engages the clamping jaw 142 and moves the clamping jaw 142 and the platen 139 down with it until the cross strands 59 are severed by the action of the blade 138 against the strip 137 and the increment of the cross ply consisting of the thus positioned and severed portions of the cross strands is drawn down against the longitudinal strands by the vacuum in the vacuum chamber 5. The cross member 68 partakes of a slight additional movement to the left viewing FIGURE 11 as above described to clear the ends of the cross strands and then moves back to the right viewing FIGURE 11 (such slight additional movement of the cross member being caused by the cam lobe 98a) for repetition of the cycle while the upper shear head 135 returns from the position of FIGURE 14 to the position of FIGURE 13. As the upper shear head 135 moves upwardly it compresses the springs 145 as shown in FIGURE 13 so that when pressure is released from above the piston in the cylinder 146 the springs 145 raise the crosshead 144 and with it the upper clamping member 142 as above explained to the position of FIGURE 11.

FIGURES 2 and 5 show how the longitudinal ply A is advanced toward the right over the vacuum chamber 5 in which the negative pressure sucks the longitudinal strands down against the screening 8. The jaws 71 and 76 draw the leading ends of the cross strands 59 across the longitudinal strands, the jaws 71 and 76 being shown diagrammatically in FIGURE 2 in the process of drawing the cross strands across the longitudinal strands. FIGURE 5 shows the cross strands as an increment of the cross ply B disposed upon the longitudinal strands and held down by the negative pressure in the vacuum chamber 5. In FIGURE 5 the cross strands are shown at a lesser angle relatively to the longitudinal strands than in FIGURE 2.

A second longitudinal ply C may be applied atop the cross ply B. The strands of the second longitudinal ply C will also preferably be of fibrous glass and drawn from suitably arranged spools (not shown) through a comb (not shown) similar to the combs 3 and 60. The strands of the added longitudinal ply C pass underneath the roller 47 so that all three plies pass together about the rollers 48 and 49. From the rollers 47, 48 and 49 the tape being formed passes over a roller 49a and through a heated resin bath in a tank 152 in which it is guided in a zig-zag path by guide bars 152a, the heated resin penetrating between the strands and acting as a binder permeating the tape being formed to permanently secure the strands together forming a unitary multi-ply tape and also acting as an impregnant or filler. As above indicated, the tape upon leaving the resin bath may be dried in air or in a drying chamber so that by the time the tape reaches the traction elements 9 the resin is dry. The tape is shown in FIGURES 1a and 3a passing through a heating or curing chamber 153 containing electric strip heaters 154 and means designated generally by reference numeral 155 for exhausting fumes. Upon emerging from the chamber 153 the tape passes under a roller 156 and thence over a cooling pan 157 containing a cooling substance such, for example, as acetone and solid carbon dioxide, whence the tape passes under a roller 158 to the traction element 9. The tape delivered toward the right viewing FIGURES 1a and 3a by the traction elements 9 may be coiled as above indicated.

While I have shown and described a present preferred embodiment of the invention and have illustrated a present preferred method of practicing the same, it is to be distinctly understood that the invention is not limited thereto.

I claim:

1. In apparatus for gripping and advancing a generally planar group of generally parallel strands,
   gripping means for gripping the leading ends of the strands,
   means for rendering the gripping means operative at a starting point to so grip the strands,
   means for advancing the gripping means generally in a direction parallel to the strands for a predetermined distance and then stopping the gripping means,
   means for rendering the gripping means inoperative to release the strands,
   means for thereafter advancing the gripping means a further distance to clear the ends of the strands and means for returning the gripping means to the starting point for repetition of the cycle.

2. In apparatus for gripping and advancing a generally planar group of generally parallel strands,
   gripping means,
   means for oscillating the gripping means in a predetermined path with a dwell at the beginning of the path,
   means for rendering the gripping means operative during said dwell to grip the leading ends of the strands,
   means for rendering the gripping means inoperative to release the strands after a predetermined advance and means further advancing the gripping means after releasing the strands to clear the ends of the strands.

3. In apparatus for gripping and advancing a generally planar group of generally parallel strands,
   gripping means,
   means for oscillating the gripping means in a predetermined path with a dwell at the beginning of the path,
   means for rendering the gripping means operative during said dwell to grip the leading ends of the strands,
   means for causing the gripping means to dwell after a predetermined advance,
   means for rendering the gripping means inoperative to release the strands during such dwell and means further advancing the gripping means after such dwell to clear the ends of the strands.

4. In apparatus for gripping and advancing a generally planar group of generally parallel strands,
   gripping means,
   driving means,
   connections including a pivoted lever operatively interposed between the driving means and the gripping means whereby the driving means oscillate the gripping means in a predetermined path,
   means for rendering the gripping means operative to grip the leading ends of the strands at one end of said path,
   means for rendering the gripping means inoperative to release the strands after a predetermined advance and means shifting the pivot of said lever to vary the amplitude of oscillation of the gripping means.

5. In apparatus for gripping and advancing a generally planar group of generally parallel strands,
   gripping means,
   driving means,
   connections including cam means and a pivoted lever operated by the cam means operatively interposed between the driving means and the gripping means whereby the driving means oscillate the gripping means in a predetermined path,
   means for rendering the gripping means operative to grip the leading ends of the strands at one end of said path,
   means for rendering the gripping means inoperative to release the strands after a predetermined advance and means shifting the pivot of said lever to vary the amplitude of oscillation of the gripping means.

References Cited

UNITED STATES PATENTS

| 1,707,943 | 4/1929 | Pocovi | 226—160 X |
| 2,495,885 | 1/1950 | Blume | 226—142 |
| 3,140,032 | 7/1964 | Heath et al. | 226—162 X |
| 3,157,334 | 11/1964 | Bunnell et al. | 226—167 X |

ALLEN N. KNOWLES, Primary Examiner

U.S. Cl. X.R.

226—162